(12) United States Patent
Bhatia et al.

(10) Patent No.: US 9,152,920 B2
(45) Date of Patent: Oct. 6, 2015

(54) SYSTEM AND METHOD OF EVENT PUBLICATION IN A GOAL ACHIEVEMENT PLATFORM

(71) Applicant: YAHOO! INC., Sunnyvale, CA (US)

(72) Inventors: Tarun Bhatia, Oak Park, CA (US); Sam Fishman, Glendale, CA (US); Prasad Chalasani, New York, NY (US); Eric Bax, Altadena, CA (US)

(73) Assignee: YAHOO! INC., Sunnyvale, CA (US)

( * ) Notice: Subject to any disclaimer, the term of this patent is extended or adjusted under 35 U.S.C. 154(b) by 231 days.

(21) Appl. No.: 13/834,277

(22) Filed: Mar. 15, 2013

(65) Prior Publication Data

US 2014/0279720 A1 Sep. 18, 2014

(51) Int. Cl.
*G06N 5/04* (2006.01)
(52) U.S. Cl.
CPC . *G06N 5/04* (2013.01); *G06N 5/048* (2013.01)
(58) Field of Classification Search
CPC ........... G06N 5/04; G06N 5/048; G06N 5/02; G06N 99/005
USPC ......................................................... 706/11
See application file for complete search history.

(56) References Cited

U.S. PATENT DOCUMENTS

| | | | | |
|---|---|---|---|---|
| 5,954,510 A | * | 9/1999 | Merrill et al. | 434/236 |
| 2008/0126277 A1 | * | 5/2008 | Williams et al. | 706/14 |
| 2009/0106071 A1 | * | 4/2009 | Mark | 705/8 |
| 2010/0070455 A1 | * | 3/2010 | Halperin et al. | 706/54 |
| 2011/0046981 A1 | * | 2/2011 | Metzler et al. | 705/3 |
| 2011/0117534 A1 | | 5/2011 | Berger et al. | |
| 2013/0073343 A1 | * | 3/2013 | Richardson et al. | 705/7.38 |
| 2014/0157171 A1 | * | 6/2014 | Brust et al. | 715/771 |
| 2014/0272847 A1 | | 9/2014 | Grimes et al. | |

* cited by examiner

*Primary Examiner* — Jeffrey A Gaffin
*Assistant Examiner* — Dave Misir
(74) *Attorney, Agent, or Firm* — James J. DeCarlo; Greenberg Traurig, LLP

(57) ABSTRACT

Disclosed herein is system, method and architecture facilitating goal setting and achievement and providing positive social and economic motivators for goal achievement. Progress toward a goal is tracked and a determination may be made based on the progress whether or not to initiate one or more actions to stimulate progress and/or increase the likelihood of success in achieving a goal and/or achieving a milestone in a path of progression toward the goal.

33 Claims, 12 Drawing Sheets

SYSTEM AND METHOD OF EVENT PUBLICATION IN A GOAL ACHIEVEMENT PLATFORM

FIELD OF THE DISCLOSURE

The present disclosure relates to facilitating achievement of goals, and more particularly to a system and method providing positive social and economic motivators for goal achievement.

BACKGROUND

People continue to set goals that they wish to achieve. A person feels a sense of accomplishment when a goal is achieved. Although set, not all goals are achieved. There are a number of reasons that a goal is not achieved, e.g., it was never achievable, initial motivation waned, etc. Positive goals and the achievement of such goals are beneficial. Thus, it would be beneficial to foster such goals and to facilitate achievement of such goals.

SUMMARY

The present disclosure seeks to address failings in the art and to provide a system, method and architecture facilitating goal setting and achievement and providing positive social and economic motivators for goal achievement.

In accordance with one or more embodiments, a method is provided, which method comprises defining, via at least one computing device, a plurality of goals, each goal's definition comprising a progression plan comprising a set of milestones to measure progress toward the goal; assigning, via the at least one computing device, users from a plurality of users to goals from the plurality of goals, each user being assigned to a goal based on a probability of success of the user achieving the goal, the probability of success is determined using at least one probability model trained from previous experience with the plurality of users and determined outcomes of the plurality of users in achieving goals from the plurality of goals, wherein the probability of success for each user is determined using the at least one probability model and information about the user; collecting, via the at the least one computing device, data about events that occur in connection with the users' progress toward their assigned goals, the event data comprising information about each event and including information about content items associated with the events; determining, via the at least one computing device, a relevance of at least one content item to at least one of the users of the plurality, the relevance being determined using the data collected about the events and the information about the content items associated with the events; and causing, via the at least one computing device, the at least one content item to be inserted in a user interface for display based on the determined relevance of the at least one content item to the at least one of the users of the plurality.

In accordance with one or more embodiments a system is provided, which system comprises at least one computing device comprising one or more processors to execute and memory to store instructions to define each goal's definition comprising a progression plan comprising a set of milestones to measure progress toward the goal; assign users from a plurality of users to goals from the plurality of goals, each user being assigned to a goal based on a probability of success of the user achieving the goal, the probability of success is determined using at least one probability model trained from previous experience with the plurality of users and determined outcomes of the plurality of users in achieving goals from the plurality of goals, wherein the probability of success for each user is determined using the at least one probability model and information about the user; collect data about events that occur in connection with the users' progress toward their assigned goals, the event data comprising information about each event and including information about content items associated with the events; determine a relevance of at least one content item to at least one of the users of the plurality, the relevance being determined using the data collected about the events and the information about the content items associated with the events; and cause the at least one content item to be inserted in a user interface for display based on the determined relevance of the at least one content item to the at least one of the users of the plurality.

In accordance with yet another aspect of the disclosure, a computer readable non-transitory storage medium is provided, the medium for tangibly storing thereon computer readable instructions that when executed cause at least one processor to define each goal's definition comprising a progression plan comprising a set of milestones to measure progress toward the goal; assign users from a plurality of users to goals from the plurality of goals, each user being assigned to a goal based on a probability of success of the user achieving the goal, the probability of success is determined using at least one probability model trained from previous experience with the plurality of users and determined outcomes of the plurality of users in achieving goals from the plurality of goals, wherein the probability of success for each user is determined using the at least one probability model and information about the user; collect data about events that occur in connection with the users' progress toward their assigned goals, the event data comprising information about each event and including information about content items associated with the events; determine a relevance of at least one content item to at least one of the users of the plurality, the relevance being determined using the data collected about the events and the information about the content items associated with the events; and cause the at least one content item to be inserted in a user interface for display based on the determined relevance of the at least one content item to the at least one of the users of the plurality.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 is illustrative of an example schematic component overview in accordance with one or more embodiments of the present application.

FIG. 2 provides examples of categories that may be used in a system in accordance with one or more embodiments of the present disclosure.

FIG. 3 provides examples of instrumentation that may be used by a system to track progress in accordance with one or more embodiments of the present disclosure.

FIG. 4 provides some other examples of incentives that may be used by a system in accordance with one or more embodiments of the present application.

FIG. 5 illustrates some additional components for use in a system in accordance with one or more embodiments.

FIG. 6 provides an overview of a process of adding users and categories within a system in accordance with one or more embodiments of the present disclosure.

FIG. 7 provides a process flow example in accordance with one or more embodiments of the present disclosure.

FIG. 8 provides an example of a sponsorship process flow in accordance with one or more embodiments of the present disclosure.

FIG. 9 provides an example of a user interface personalization process flow in accordance with one or more embodiments of the present disclosure.

FIG. 10 provides an example of a targeted segment process flow in accordance with one or more embodiments of the present disclosure.

DETAILED DESCRIPTION

Figure 1:
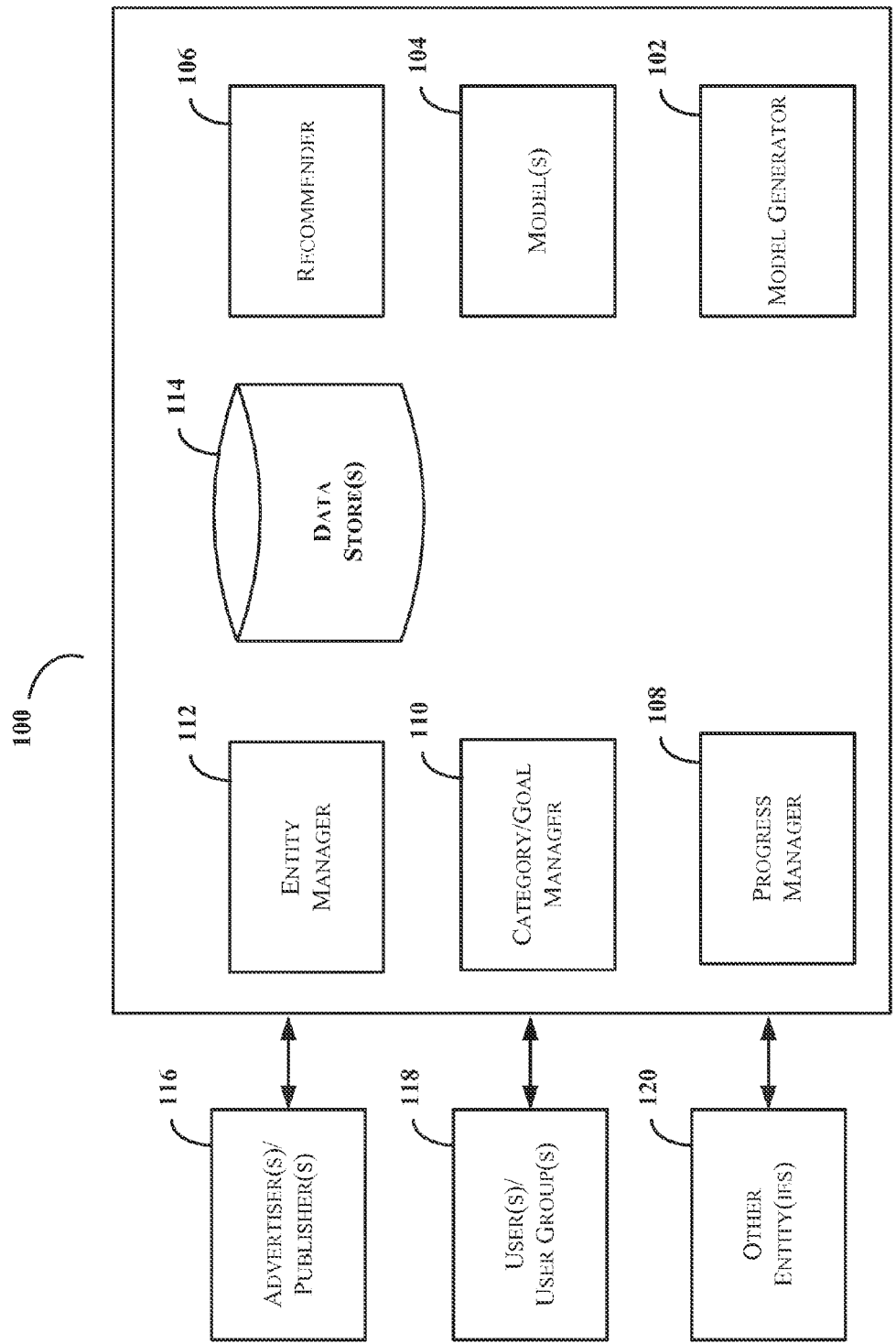

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

Certain embodiments of the present disclosure will now be discussed with reference to the aforementioned figures, wherein like reference numerals refer to like components.

In general, the present disclosure includes a system, method and architecture provide a system, method and architecture facilitating goal setting and achievement and providing positive social and economic motivators for goal achievement.

Embodiments of the present disclosure provide a system and method to maximize likelihood of a user group's sustained progression towards an adopted goal. In accordance with one or more such embodiments, a goal may be set for a group of users to achieve, a user may be assigned to the group, data and/or feedback may be collected, and various motivational activities may be used to maximize the likelihood of the group's sustained progression toward the goal set for the user group and the users in the group. Data is collected and may be used to estimate the likelihood of success in reaching a goal, and/or to estimate the likelihood of progression toward the goal.

By way of some non-limiting examples, group competitions may be scheduled and held, economic and/or social motivators may be provided. The data that is collected may be used to make recommendations to users, such as and without limitation recommendations for assignment of a new user to a goal and/or a user group associated with the goal, and/or reassignment of a user to a new goal and/or user group. The data that is collected may be used to train and/or retrain a prediction model, or models, which may be used to make predictions regarding success, e.g., sustained progression toward a goal and/or achievement of the goal. A model, or models, may be used to drive decisions intended to foster the achievement of a goal. As discussed, a model might be used in assigning a user to a user group. Another non-limiting example involves timing and use of motivators, and/or which motivators to use, in order to increase the probability of success. By way of a further non-limiting example, it might be determined from the prediction output provided by the model that a motivator in the form of an event and/or competition may provide motivation for a user group's continued progress toward the group's goal; e.g., the model output may be used to identify the type of competition, e.g., a dare, dual, etc., that is likely to provide a maximum motivation, e.g., has the greatest likelihood to motivate relative to the likelihood to motivate determined for other types of events and/or competition. By way of some further non-limiting examples, a prediction, or predictions, of the probability, or likelihood, of success may indicate that some type of incentive, e.g., monetary, social etc. incentive, sponsorship and/or marketing drive might provide motivation. Of course, a single motivator or a combination of motivators might be identified to maximize the likelihood of success.

In accordance with one or more embodiments, a user may be a person, or other entity, that is pursuing a goal or has achieved a goal. An entity, such as an advertiser, other user, etc. may be interested in, and/or is, sponsoring or endorsing a user or a user group. An entity, e.g., a publisher, may be interested in, and/or is, providing content, e.g., marketing materials. Embodiments of the present disclosure provide enriching user experiences together with opportunities for meaningful engagement by advertisers and/or publishers.

Embodiments of the present disclosure may use data, e.g., user, advertiser and/or publisher data or profiles, accumulated for entities, e.g., one or more of the users, advertisers and publishers, which data may be gathered in connection with a system configured in accordance with one or more embodiments of the disclosure and/or data obtained from another system or network.

Embodiments of the present disclosure support achievement of a goal at the group level by focusing on a group dynamic and using data-driven learning techniques that use collected data to train one or more prediction models. In so doing, for example, it is possible to use embodiments of the present disclosure across a broad class of interest categories. In addition to providing capabilities such as tracking progress and logging data, e.g., progress data, embodiments of the present disclosure may make informed, intelligent recommendations to facilitate achievement of goals and to maximize the likelihood of achieving the goals. Additionally, embodiments of the present disclosure create and/or promote meaningful and positive opportunities with which advertisers, e.g., brand advertisers, may associate, and/or for quality content for publication networks to share more freely. In accordance with one or more embodiments, such interactions help foster engagement by new and existing users, advertisers, publishers, third parties, and/or other entities.

FIG. 1 is illustrative of an example schematic component overview in accordance with one or more embodiments of the present application. In the example shown, system 100 comprises components such as and without limitation model generator 102, model(s) 104 which may be generated by model generator 102, recommender 106, progress manager 108, category manager 110 and entity manager 112. System 100 might interact with one or more entities, such as and without limitation user/user group 118, advertisers/publishers 116 as well as other entities, or third-parties, 120. An example of another entity 120 may be an entity that provides feedback in the form of evaluation of the progress of a user and/or user group toward a goal. By way of a further non-limiting example, such feedback might be in connection with an event or competition and might include the entity's evaluation of the success or failure of the user and/or user group in the connection with the event or competition. Of course, it should be apparent that feedback may be obtained from entities 116 and/or 118.

Model, or models, 104 may be trained using data collected about users, user groups, goals, categories, advertisers, publishers, outcomes, e.g., success/failure, of previous attempts at goal achievement, etc. The data may also comprise data about actions taken, or motivators used, to motivate a group of users, such as without limitation to action taken, the point at which the action was taken the probability of success before the action was taken, the probability of success after the action was taken, etc. The data may further include a progression plan for a given category or goal, which plan may comprise a set of milestones, or states, in the progression toward achieving a goal and criteria for transitioning from one milestone/state to another. The data collected might be stored in data store(s) 114. While data store(s) 114 is/are shown as being internal to system 100, it should be apparent that some or all of the data may be stored and/or maintained externally, e.g., by one or more systems external to system 100. Additionally, it should be apparent that models 104 may be included in data stores 114. In accordance with one or more embodiments, model(s) 114 is/are trained using training data for users that succeeded in their endeavors and users that failed in their endeavors, as well as the items, e.g., goals, milestones, mechanisms, progression pathways, etc., associated with the users' successful and unsuccessful endeavors, and data collected about the items and the users' endeavors.

In accordance with one or more embodiments, data that is collected and used to train model(s) 104 may include data about users, e.g., data that may be stored in user profiles of registered users, data about what users and/or user groups succeeded or failed at while in pursuit of, and/or achieving, a goal, data about attempts at achieving a goal that were successful and about attempts that failed, data about actions taken, e.g., events or competitions used, to motivate users/user groups to progress toward a goal including data that may be used in evaluating how impactful the action was at progression toward, and/or achievement of, a goal, etc.

Model(s) 104 may be used by recommender 106 of system 100 to recommend one or more goals to a user and/or recommend one or more alternative user groups for a user seeking to achieve a goal. Model(s) 104 may be used by progress manager 108 of system 100 to suggest timely interventions, e.g., in the form of one or more actions to be taken, which interventions/actions may be sourced across the community, including without limitation sourced by users/user groups 118, publishers/advertisers 116, and/or other entities 120. By way of a non-limiting example, progress manager 108 might suggest an event or competition. By way of another non-limiting example, progress manager 108 might make suggestions with regard to assigning a new user to a user group, reassigning a user to another user group, modifying the plan for progression toward a goal, etc.

Progress manager 108 might collect feedback about the progress of a user and/or user group toward a goal. Feedback from a user and/or user group, e.g., self-declaration, may be accepted by progress manager 108, however, progress manager 108 need not rely exclusively, if at all, on self-declaration; however and advantageously, progress manager 108 may receive feedback to evaluate and monitor progress toward a goal from entities other than the user and/or user group that is seeking to achieve the goal, and/or the user and/or user group that is participating in an event, competition and/or other evaluation.

Entity manager 122 may manage any of entities 116, 118 and 120. By way of some non-limiting examples, entity manager 122 might receive requests new entities and/or entity manager 122 might seek an entity's participation.

In accordance with one or more embodiments, category manager 110 may manage the one or more categories that may be defined for system 100, relationships between the one or more categories. In accordance with one or more such embodiments, each goal defined for system 100 may be assigned to one or more categories, and a user and/or user group may be associated with one or more goals. In accordance with one or more embodiments, a goal may be a leaf node of a branch of a category hierarchy.

Recommender 106 may recommend users for a group, which group is pursuing a collective goal within a category. System 100 may be used to align users in a group based on proficiency, targeted improvement rates, or category specific distinctions. In accordance with one or more embodiments, recommendations are made based on a likelihood of success given the available groups and taking into account the impact of the individual users within a given group or groups.

In accordance with one or more embodiments, a group's size, composition and proficiency level, which proficiency level may be determined as an aggregate of the proficiency levels of users in the user group, may be controlled. Diversity may be a factor in selecting users for a user group. By way of a non-limiting example, model(s) 104 may be used to determine a level of diversity that will likely promote fun and learning opportunities.

Progress toward a goal may be monitored, e.g., by progress manager 108, at the user level and at the group level, which may be an aggregate of the progress of the users in the group. In accordance with one or more embodiments, data may be collected from past assignments, including without limitation assignments of users to groups, and data collected concerning user and user group success and failure. Collected data may be used to determine the likelihood of group success with each new user's potential assignment. Alternatively and according to embodiments of the present disclosure, users may have an option to collectively create a user group, such as without limitation from an existing social community, which community may be a geographic community, online community, co-workers, fellow students, family members, etc.

In accordance with one or more embodiments, category manager 110 manages categories, such as categories for personal achievement and improvement. Categories may be defined in a hierarchy of categories. A category may have one or more associated goals, e.g., a branch of a category hierarchy may include one or more leaf nodes, each of which may correspond to a goal. Category manager 110 may manage creation of new categories and/or goals within each category. In accordance with at least one embodiment, each category/goal that is adopted for use in system 100 has a defined plan, or notion, of progress, e.g., which comprises one or more states, stages, milestones, etc. that are intended to be met along the path to achieving a goal within the category. A progression play may further identify techniques to be used for determining whether or not a stage, or milestone. Where a determination is made that a milestone has been satisfactorily completed, a user group may transition to a new state/milestone in its quest to achieve its goal. In accordance with one or more embodiments, a determination whether or not a milestone has been satisfied and/or a state transition should be allowed may be based on entity feedback and or other data that may be used to measure the progress.

In accordance with one or more embodiments, a collection of milestones may be identified within each new category using expert-led and crowd-sourced user interactions, and such milestones may be voted on and/or adopted by other users. For instance, for learning a new instrument such as drums or piano, there might be one or more playlists submitted by experts and adopted by users seeking to achieve a goal of learning to play a new instrument.

By way of a non-limiting example, an expert might submit a musical piece or manuscript, and the successful mastery of the musical piece or manuscript might constitute a task for another person to perform to receive credit toward a milestone and/or goal, such goal might be to dabble in arts, learn to play music, master Bach etc. Additionally, the submission, e.g., a musical piece, manuscript, etc., may include information that is provided by the expert, another expert or another member, or members, of the community, which information may comprise information identifying a set of prerequisite skills, prerequisite level(s) of achievement for satisfactorily completing the task, etc., which prerequisite(s) is/are considered useful or necessary for successfully completing the task, and further may be used by system 100 to match the user to a task, milestone, goal, mechanism, instrumentation, etc. In accordance with one or more embodiments, system 100 is configured to match a user with items, and each of item may be a category, a category hierarchy/map, goal, a progression path for achieving a milestone/goal associated with a category, a task, an activity, etc. using model(s) 104, which model(s) 114 are used to predict a likelihood of success for one or more alternative items, and system 100 may make a recommendation to the user of one or more matches that the system 100 determines maximizes the user's likelihood of success.

Furthermore and in accordance with one or more embodiments, system 100 is configured to allow for the addition and or removal of an item, such as a category, a category hierarchy/map, goal, a progression path for achieving a milestone/goal associated with a category, a task, an activity, etc. By way of a non-limiting example, goals, milestones, and progression pathways might be added per category.

An item might be added by entity 116, 118 and 120, for example. An added item may effectively be in competition with other, existing items, e.g., a task may effectively compete with another item, which competition may result in an item, or items, being removed from consideration by the system 100. The competition having a benefit of identifying an item that facilitates a user's achievement(s) versus an item that fails to facilitate the user's achievement(s). By way of a non-limiting example, data collected by system 100 may include feedback that a new task submitted to system 100 by an expert is less likely to aid a user to achieve a goal/milestone than other tasks, which may result in system 100 ignoring the task when making future tasks recommendations for a milestone/goal. Additionally, system 100 may use the data to control the impact, or weight, that the input from the expert, or another entity, has on the system. By way of a non-limiting example, future input from an expert that proposes a new task will be given more weight and consideration by system 100 where the feedback concerning an expert's previous input is positive as opposed to negative.

In accordance with one or more embodiments, data store(s) 114 may comprise a library of mechanisms. In accordance with one or more such embodiments, a mechanism may identify an incentive, or motivator, and guidelines for using the mechanism. By way of some non-limiting examples, a mechanism, or mechanisms, aid a user in achieving a goal/milestone, and may include self-motivator(s), e.g., self-declaration(s); economic motivator(s), e.g., sponsorship, endorsement, bet, etc.; social motivator(s), e.g., prospect of failing, prospect of public shame, etc., competition, e.g., dual, dare, bet, etc.; demonstration, e.g., recital, or any content, artifact or output from a user that may or may not be provided to one or more entities to illicit their feedback, etc.; and the like. The guidelines associated with mechanisms identified in the mechanism library may be used to make one or more mechanism recommendations to a user, e.g., system 100 may make a determination that the user's probability of achieving a milestone/goal is increased if the user participates in a competition with other users and system 100 may recommend that the user participate in the competition with other users based on the determination that the mechanism is likely to increase the likelihood that the user will successfully complete the milestone/goal. In accordance with one or more embodiments, the library of mechanisms is designed to maximize the probability of success for different user profiles and category/goal combinations, and system 100 may personalize mechanism recommendations for each user using model 114. Model 114 may be trained to identify those mechanisms that are likely to result in success for the user using information about the user, information about past users, past successes, past failures, etc. By way of a non-limiting example, system 100 may recommend that a user self-declare completion of an artifact, e.g., the user provides GPS data showing that the user completed a hike, where information about the user indicates that the user is self-motivated.

In accordance with one or more embodiments, system 100 is configured to present a user with one or more recommendations, which recommendations may be based on the user's past achievements, e.g., system 100 may make goal recommendations based on one or more goals successfully-completed by the user. By way of a non-limiting example, system 100 might recommend a goal of mastering Bach given that the user mastered a goal of learning to play music. Thus, system 100 matches a user to items, e.g., activities, goals, progression paths, etc. and system 100 provides the user with choices from which the user is able to select. System 100 tracks the user's progress and may provide alternatives along the way to maximize the likelihood that the user will successfully achieve an item recommendation selected by the user.

By way of a further non-limiting example, system 100 may use model(s) 114 to match a user with a set of categories and/or a category map as recommendation(s), and may present the user with the recommendation(s) so that the user is able to select a category. The category recommendation(s) may be based on a favorable probability of success, e.g., at least a threshold probability, such as without limitation a 75% probability, associated with the category recommendations. For example, the probability of success for a given category may be based on a probability of success of the user achieving a goal, or goals, associated with the category. It should be apparent that the threshold probability of success may be any value, and further that the value may be common for some or all of the users and/or may be uniquely set for some or all of the users.

In response to a category selection, system 100 may match the user with one or more goals as recommendations, e.g., the one or more goals may be from a category selected from the set of goal recommendation(s). Each of the one or more goals matched with the user may be identified for the user based on a probability of success of the user achieving the goal. System 100 may present the goal recommendations to the user so that the user is able to select one or more of the goal recommendations. In response to a goal selection, system 100 may match the user with one or more progression pathways, or progression plans, toward achieving the selected goal as recommendations. Each of the one or more progression pathways matched with the user may be identified for the user based on a favorable probability of success of the user achieving the goal. Each of the progression pathways may comprise one or more milestones for achieving the associated goal. The user may select a progression pathway. System 100 may monitor the user's progress along the selected progression pathway, e.g., which milestones have been successfully completed by the user and/or remain to be completed by the user, and may make one or more recommendations to facilitate the user's endeavor, which recommendation(s) may be based on a probability of success determined for the user by system 100 using model(s) 114 together with data collected by system 100, including data collected about the user's progress toward the goals and the user's involvement with system 100, e.g., the user's successful and/or unsuccessful endeavors at a category(ies), goal(s), progression pathway(s), mechanism(s) and/or milestone(s). The recommendation(s) of system 100 may comprise one or more mechanisms that may motivate the user to continue along the selected path, one or more recommendations to modify the path and/or to adopt a new path, etc.

Figure 2:
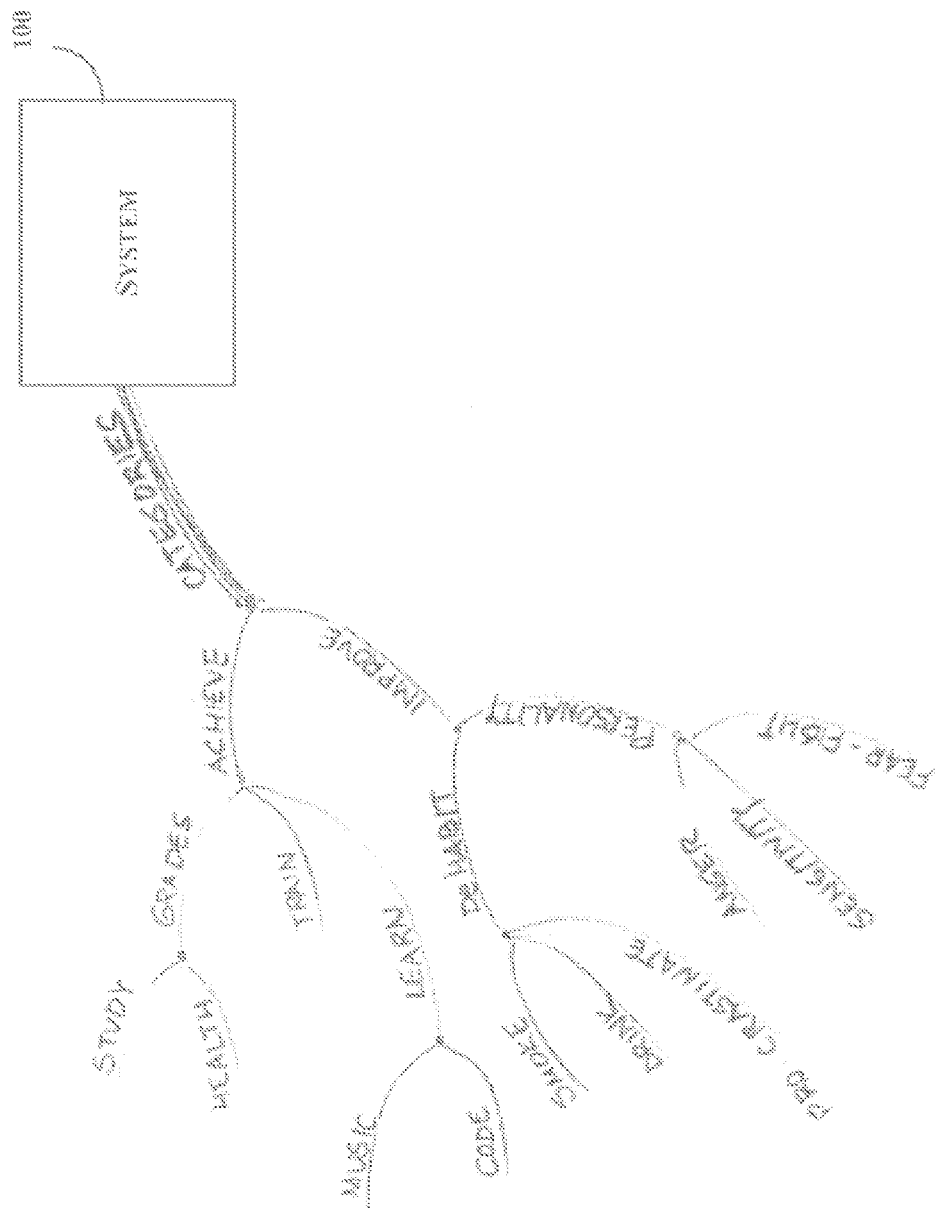

FIG. 2 provides examples of categories that may be used in system 100 in accordance with one or more embodiments of the present disclosure. A hierarchy, or map, of categories is shown, which map/hierarchy includes an achieve category and an improve category. Categories under the achieve category include grades, train, and learn categories. Other non-limiting examples of categories, which categories fall under the grades category include study and health categories. By way of a non-limiting example, a goal in the health category might be one to achieve a certain health-related status, e.g., one such goal might be to lose ten pounds. Other achievement-type categories are train and learn, and the learn category may include categories related to learning music or code. The example categories shown in FIG. 2 include an improve category, which includes categories for improvement, e.g., de-habit or breaking a bad habit or improve characteristics of one's personality, e.g., such as addressing issues with anger, sensitivity, fear, fight, etc.

Figure 3:
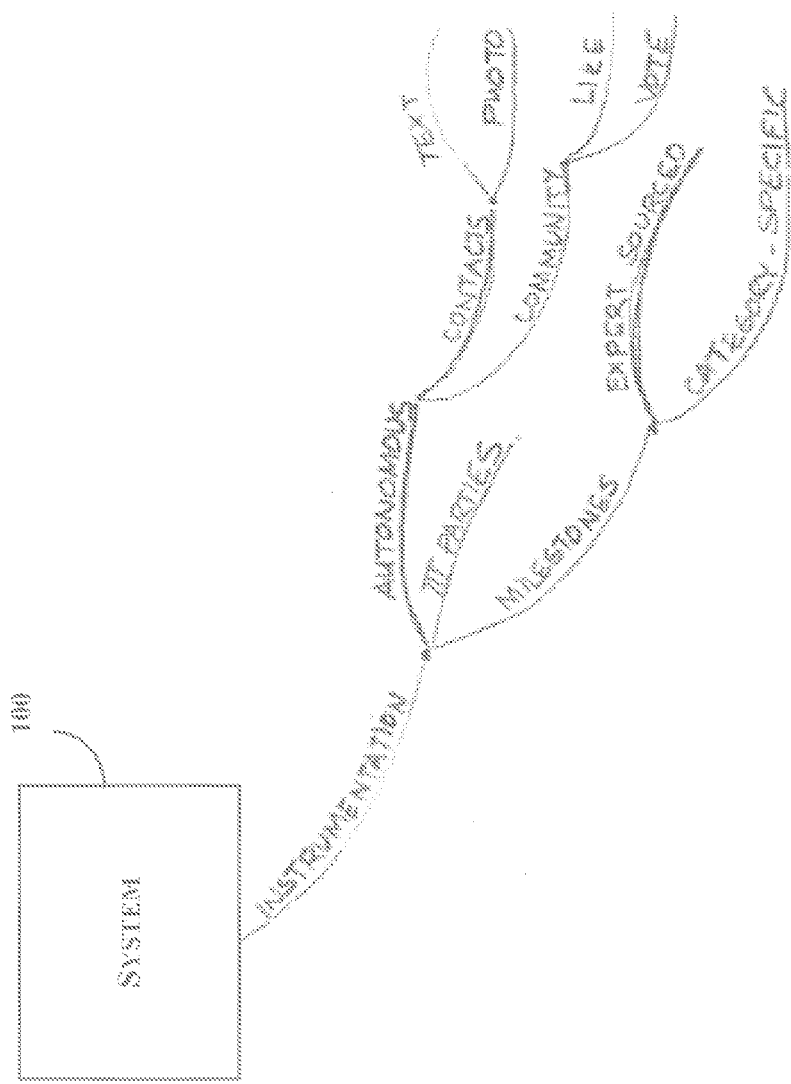

Embodiments of the present disclosure may track the progress of a user and/or user group in achieving a goal using various instrumentation, or tools. One example, self-declaration, has the users themselves providing feedback as to their own progress. Additionally and in accordance with one or more embodiments, other forms of instrumentation, e.g., autonomic instrumentation, may be used to allow other entities to provide feedback. FIG. 3 provides examples of instrumentation that may be used by system 100 to track progress in accordance with one or more embodiments of the present disclosure.

In the example, any entity, including third parties who may or may not be involved with system 100, might be involved in providing information for use in tracking progress. Additionally and as shown in the example of FIG. 3, milestones, which may be specific to a given category and/or specified by an expert, or experts, for example, may be established and the information that is received may be used to track progress toward a milestone, or milestones.

By way of a non-limiting example, a user group might be asked to demonstrate progress toward a milestone, or milestones, and the demonstrated progress might be rated on quality, and/or other criteria, by others. By way of a further non-limiting example, users in a group with a goal of learning to play the piano might be asked to demonstrate that they are able to play one or more songs on the piano. The demonstration(s) might be videotaped and made available online, e.g., via YouTube™, and a rating community might view and rate the play of the user(s) in the group involved in the demonstration(s).

The example of FIG. 3 further includes an autonomous instrumentation for feedback, which might be provided by any entity, including members of the user community, e.g., users 116, advertisers/publishers 116, and/or contacts, e.g., friends, co-workers, and/or others, etc. In accordance with one or more embodiments, any entity may submit progress information in various forms, including messages, e.g., short message, text, email, etc. messages and/or photographs, as evidence corroborating progress toward, or regress from, a milestone and/or goal. The evidentiary submission might be made via any messaging platform, including without limitation Facebook™, Twitter™, etc., and/or photo submitted to a photo-submission platform, e.g., Flickr™, etc. There might be limitations or safeguards on who can and cannot submit such inputs to the system 100 for the user, in accordance with a principle to provide a safe and positive environment. Additionally, users who submit such evidence on another user, e.g., one user of a group who posts a picture of another user smoking at a party when the users' group has a goal to reduce or quit smoking, might be given an incentive or otherwise supported for making the submission. A group member or other user may be compensated by the group or other entity for making the submission. Thus, entities involved in system 100 may opt for full transparency and are encouraged to report transgressions, which transgression need not be viewed negatively but rather as an opportunity to receive tailored support from a sympathizing community and/or group.

In accordance with one or more embodiments, various incentives might be used to motivate users in a user group to progress toward achieving a goal. By way of a non-limiting example, economic incentives might be provided to a user group from one or more of a social contact, advertiser, sponsor, etc. In accordance with one or more embodiments, an incentive might be withdrawn or updated based on a group's progress. By way of a non-limiting example, a group might cash in an incentive offered by a sponsor upon meeting a milestone in a goal's progression path. The sponsor might then offer an added incentive motivating the group to proceed further with greater payoff. By way of a further non-limiting example, a user might dare another user with a monetary pledge to go to the gym, and other users might be invited to add to the pot. At some point, advertisers might also add an option to earn branded merchandise. In general, incentives may change in response to team achievements.

Figure 4:
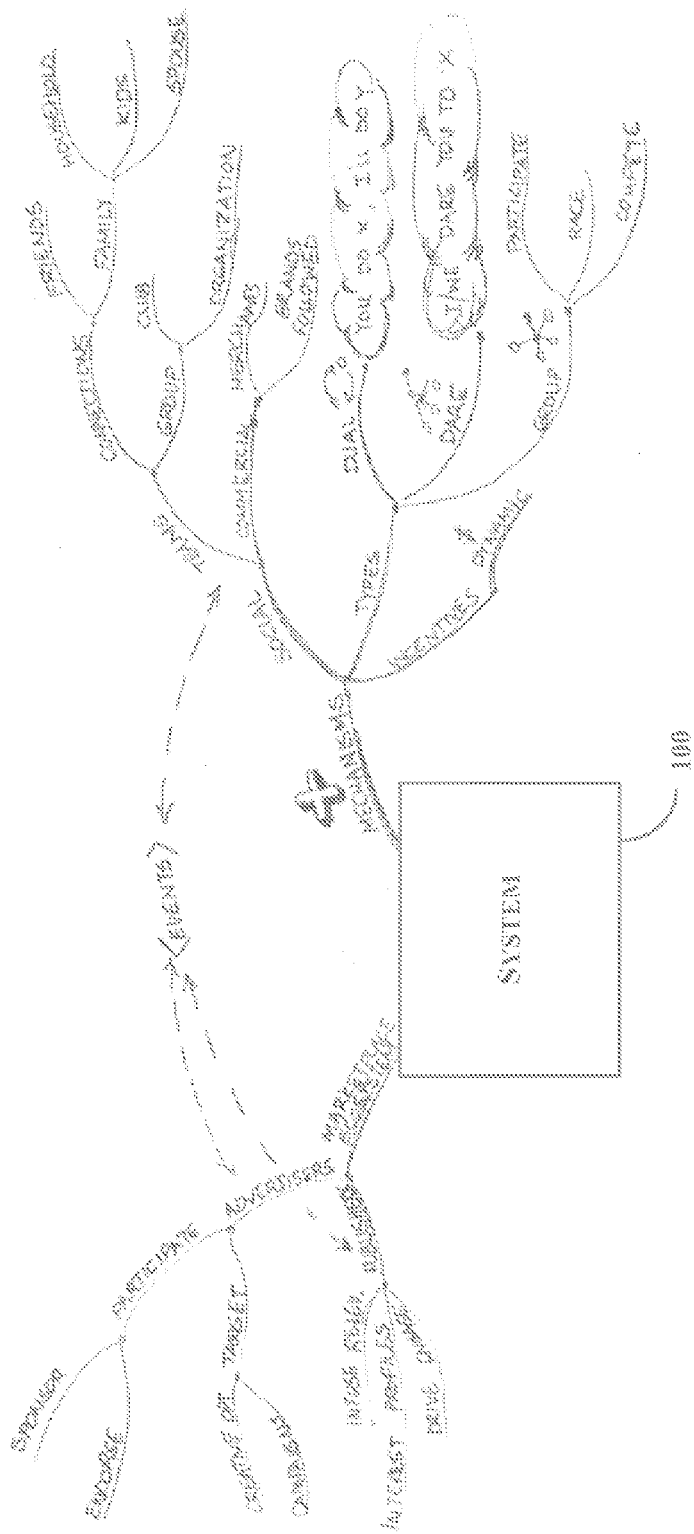

FIG. 4 provides some other examples of incentives that may be used by system 100 in accordance with one or more embodiments of the present application. As shown in the example, incentives may be social, economic, etc. Events provide an ability to show progress, which showing might involve a demonstration or submission of evidence of progress, e.g., recording of a user, or users, playing an instrument, and to solicit feedback. The event and feedback from the event may be used to quantify the degree and/or the quality of progress achieved toward a goal and/or a milestone associated with a goal by a group.

In the example shown in FIG. 4, examples of events, or mechanisms, which may be used to motivate users in achieving goals and/or tracking progress toward a milestone or goal might include novel pacts between users and/or user groups. By way of some non-limiting example, a dual pact might involve one user promising to give up X if another user gives up Y); a dare pact might involve one user daring another user to improve on X; a group pact might involve a group signing up for a specific pace for achieving a goal, e.g., a pace for improvement; teams might hold races and competitions. As discussed herein, incentives may also be used in motivating and tracking progress.

The example provided in FIG. 4 includes some examples of teams and their members. In the example, teams may be formed from social connections, such as connections formed between friends or connections based on familial relationships, e.g., a team comprised of all of some members of a household, children, a spouse, etc. Teams might also be formed by members of a club, community, organization, etc. Teams might be formed based on a shared affinity for a merchant, or merchants, and/or a brand, or brands.

As shown in FIG. 4, there might be a connection between entities 116, 118 and 120 based on an event, or events. By way of a non-limiting example, an advertiser 116 might sponsor or endorse one or more users 118 and/or groups of users 118 involved in an event, and a publisher 118 might publicize an event, which may increase interest of third parties or other entities 120, drive, or promote, engagement by entities in an event, and/or infuse relevance for the event. System 100 may provide information about users/user groups 118 and/or other entities so that the advertiser 116 is able to target advertisement, generate targeted or other advertisement/creative content, which content might feature model group(s), e.g., a model group might be a group that has successfully achieved a goal or is successfully progressing toward the goal. A publisher 116 might target its content, e.g., publication(s) about an event, to particular entities using interest profiles, for example. An advertiser 116 might target advertising content or other creative content and/or design an advertising campaign for a given event, or events.

In accordance with one or more embodiments, system 100 may schedule an event based on a request from an advertiser/publisher 116, user/user group 118 or other entities 120. System 100 may also initiate an event in an effort to motivate or energize users in progressing toward their goals. By way of a non-limiting example, system 100 may use model(s) 104 to identify a dual, dare, demonstration, etc. that is likely to result in a positive impact on achieving, e.g., movement toward, a goal. System 100 may also determine which advertiser(s) and/or publisher(s) are likely to be interested in participating and invite them to participate. An advertiser 116 and/or publisher 116 may be persuaded to participate in response to such a proposal based on information provided by system 100, which information may include a probability, or probabilities, of success of the users/user groups 118 that are going to participate, or are participating, in the event, demonstration, etc. An advertiser/publisher 116 is more likely to want to be associated with an endeavor that is likely to succeed, and the probability(ties) of success generated by system 100 provide meaningful information in this regard.

Figure 5:
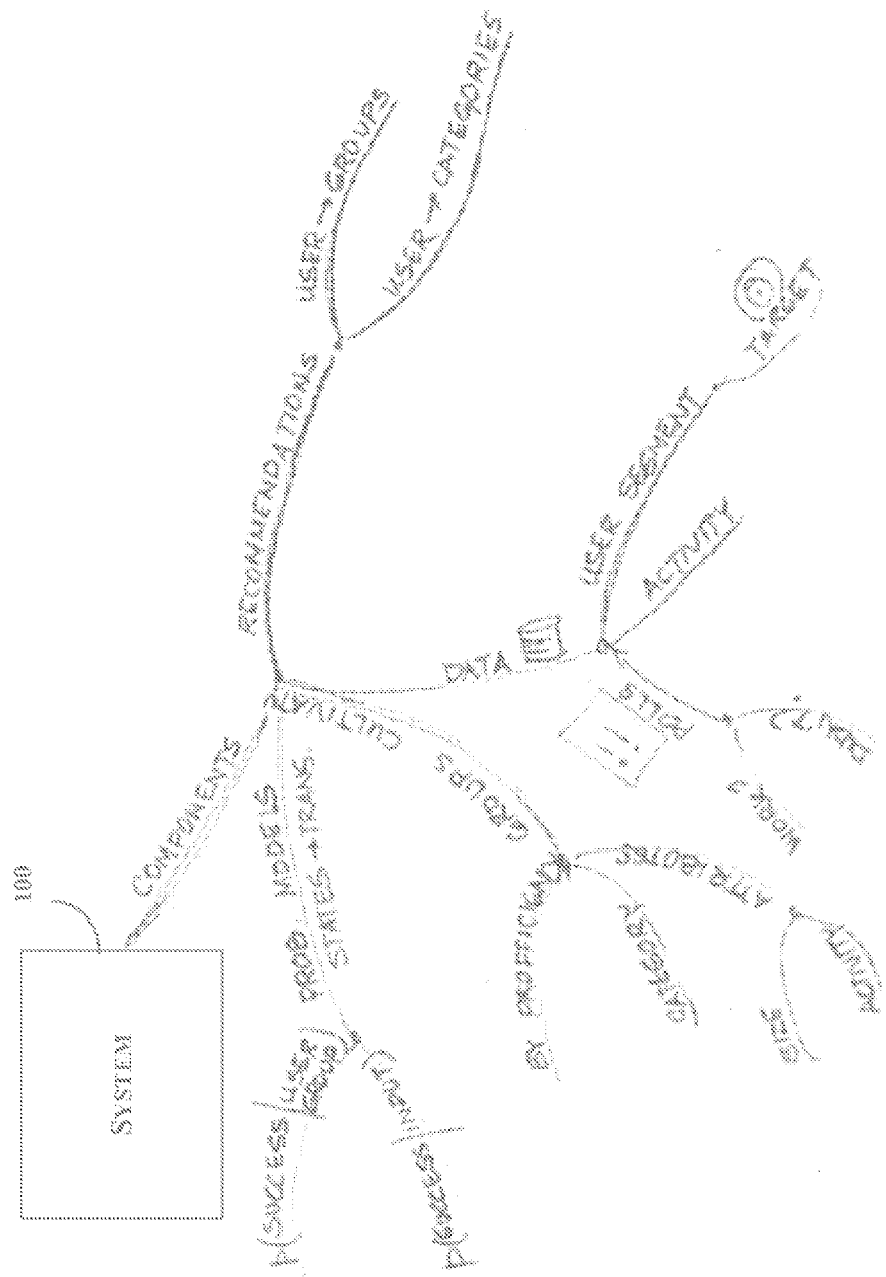

FIG. 5 illustrates some additional components for use in system 100 in accordance with one or more embodiments. As discussed herein, system 100, e.g., recommender 106, may make recommendations for assignments of users to user groups. By way of a non-limiting example, system 100 identify one or more user groups. The user group recommendation(s) may be identified based on possible goals in which the user has interest, a user's compatibility with a group's users/members, a likelihood that the user will have a positive impact on the group and/or that the group will have a positive impact on the user. In accordance with one or more embodiments, the likelihood may comprise a likelihood of success of the user group if the user is a member of the group as compared with the likelihood of success of the user group without the user.

In accordance with one or more embodiments, recommender 106 may provide a user with one or more category recommendations. Such recommendations may be based on information known about the user, e.g., data contained in the user's profile such as demographic information, interests, online browsing, purchasing, etc. activities, social connections, social and/or other affiliations, etc. Category recommendations may also be based on a likelihood/probability of success associated with a category/goal.

Recommender 106 may use probability model(s) 104 to determine a likelihood/probability of success of a user and or user group in achieving a goal. In accordance with one or more embodiments, a path to achieving a goal may be defined using states, or milestones, each of which has one or more factors/criteria for evaluating progress and/or eligibility to advance/transition to another state/milestone.

In accordance with one or more embodiments, a state may comprise a number of milestones, each of which is to be satisfactorily completed before transitioning to another state. By way of a further non-limiting example, an initial state for a user group having a goal to learn to play the piano might be to demonstrate a basic skill level, e.g., playing songs to demonstrate a basic proficiency with the piano's keys/keyboard, before transitioning to the next state that requires more advanced skills, e.g., chord progressions. Model(s) 104 may be used by system 100, e.g., by progress manager 108, to determine a user's/user group's 118 progress toward transitioning to a next state. Progress manager 108 may use feedback received from a demonstration, event, etc. to make an evaluation of the current progress and/or to determine a probability that the user/user group 118 will successfully complete the current state and transition to the next state. System 100 may assign a user group to one of a plurality of category-specific states of advancement, and compute the likelihood of a successful state transition in making recommendations. States may be linear in progression but need not, states may be connected in natural pathways providing several paths for progression toward satisfaction of a goal.

As discussed, system 100 may cultivate user groups 118, and may select users to form a group 118 using any of a number of criteria, e.g., proficiency, category, attributes such as size and activity, diversity, etc. Data from past assignments of users to groups and/or the group's successes and/or failures may be collected and used to determine the likelihood of group success with each new member's potential assignment. Some data may be collected by polling users, e.g., engaged and/or disengaged users, to provide labeled data for supervised learning algorithms to build model(s) 104, which model(s) 104 may include models tailored for each category of goals and may take into account group profiles and/or user profiles. The model(s) 104 may be used to predict the likely outcome of success for groups and/or being able to detect a progress motivator a progress de-motivator, etc. By way of a non-limiting example, polling may be used to identify the strongest de-motivator within a procrastinator category. By way of a further non-limiting example, data may be collected for a given activity and/or for a given user segment and/or a targeted user/users.

In accordance with one or more embodiments, system 100 can collect data about the activities of a user, or user group, including without limitation a user group's activities demonstrating progress toward, or regress from, a user group's goal. Upon achieving a certain level of confidence in the progression and commitment of a user group, or user groups, system 100 may assign the user group(s), or users of the user group(s), to segments where advertisers and publishers can use this information to target, e.g., with advertising, and/or determine relevance of content for each segment.

Figure 6:
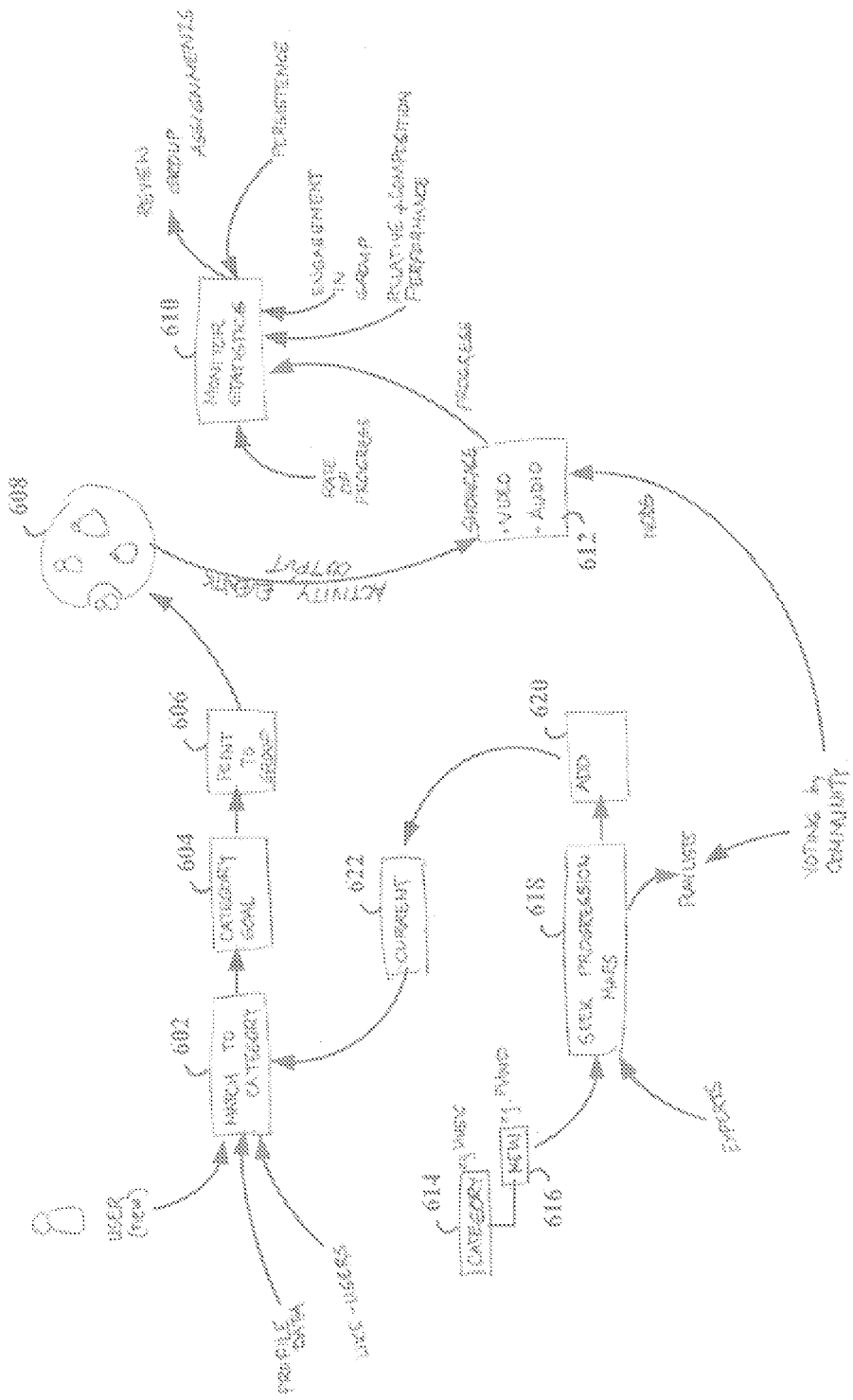

FIG. 6 provides an overview of a process of adding users and categories within system 100 in accordance with one or more embodiments of the present disclosure. In the example shown in FIG. 6, a new user may be matched to one or more categories, 602, and matched to one or more goals within a matched category, 604. Given category and goal matches for a user, system 100 may make recommendations of one or more groups for the user, each recommendation being associated with a category and goal match identified for the user. The user may select a user group 608 from one of the recommendations made by system 100. In accordance with one or more embodiments, system 100 may use one or more user profile or other user data collected by another system about the user and other users to identify one or more similar users, such as users that have similar likes and/or dislikes, interests, etc., which information may be used by system 100 to identify the user recommendations. The user may be associated with a cluster of similar users using profile and other user data.

Another non-limiting example of other data that may be used by system 100 include input from the user identifying one or more categories that are of interest to the user and/or identifying one or more goals within a category that is/are of interest to the user, which input may be used by system 100 to match a user to other users/user groups. As yet another non-limiting example of information about a new user that may be used to match the user to one or more categories, goals and/or user groups, interactive exercises in which the user's actions provides initial data may be used to map the user to potential categories/goals of interest and appropriate groups therein.

One or more groups may be recommended to the user by system 100, and the user may be given an opportunity to select one or more groups of their choice. In accordance with one or more embodiments, a user may select a user group from the one or more user groups recommended by system 100. Once the user is associated with a user group, 608, e.g., a user group selected by the user or assigned by system 100, system 100 may track the user's initial engagement with the user group for a period of time to determine the fitness of the assignment. System 100 may conduct periodic reviews of each user's activity statistics relative to the group's statistics to determine whether or not it may be necessary to re-assign one or more users in the user group. By way of a non-limiting example, one or more re-assignments may be performed where system 100 determines that there is a better assignment for a user, which determination may be based on a determination that there is a greater probability of success for sustained progress for the affected group(s) and/or user(s) from the resulting re-assignment.

In the example shown in FIG. 6, system 100, e.g., progress manager 108, may generate and/or monitor statistics, 610, such as without limitation progress, rate of progress, probability of success, which probability may be based on progress and/or rate of progress, a user's engagement in a user group and/or a user's persistence, e.g., a user's continuing or sustained effort toward a goal, and reviews group assignments, e.g., a user's assignment to a particular user group 608. Input about a user's progress and/or a user group's progress is received by system 100. FIG. 6 provides one example in which user group demonstrates, or showcases, its progress via one or more demonstrations 612, which may comprise a video, audio, audiovisual, etc. demonstration. Feedback on the demonstration(s) 612 may be received by system 610 from a voting community as progress input, which may be used to generate and/or monitor statistics 610.

In accordance with one or more embodiments, a category when introduced may be introduced by any entity, including without limitation entities 116, 118 and 120, experts, etc. In accordance with one or more embodiments, a new category 616 may be added and associated with an existing category 614 by system 100, e.g., category manager 110. System 100 determines a progression map 618, which may include a series of stages, which may comprise one or more milestones, and mechanisms for measuring progress toward, and/or completion of, the stage/milestone. System 100 may seek input from one or more experts in determining the progression, or progress, map. In the example shown in FIG. 6, the new category being added is "piano" and experts may be asked to identify a set of playlists that are to be played by users in user group 608 to showcase their abilities, which will be voted on by a voting community. In the example, system 100 may seek feedback from the voting community regarding the playlist suggestions provided by the expert(s). System 100 adds, 620, the new category, 616, to the set of categories, 622, which set may be used to match a user to one or more categories, 602.

By way of a non-limiting example, the expert(s) that is/are used for the new category 616 may be a user, or users, with experience and/or authority in a category, or categories, related to the new category, such as a music and/or arts category(ies) for a piano category that is being added. An expert may be established by system 100 based on the user's involvement with system 100 and/or the user's activities outside system 100. Expert inputs, in terms of milestone or paths, may be adopted and voted on by the community. In this manner, the most efficient and popular maps will recommend progression paths to monitor progress for the category for various groups.

Figure 7:
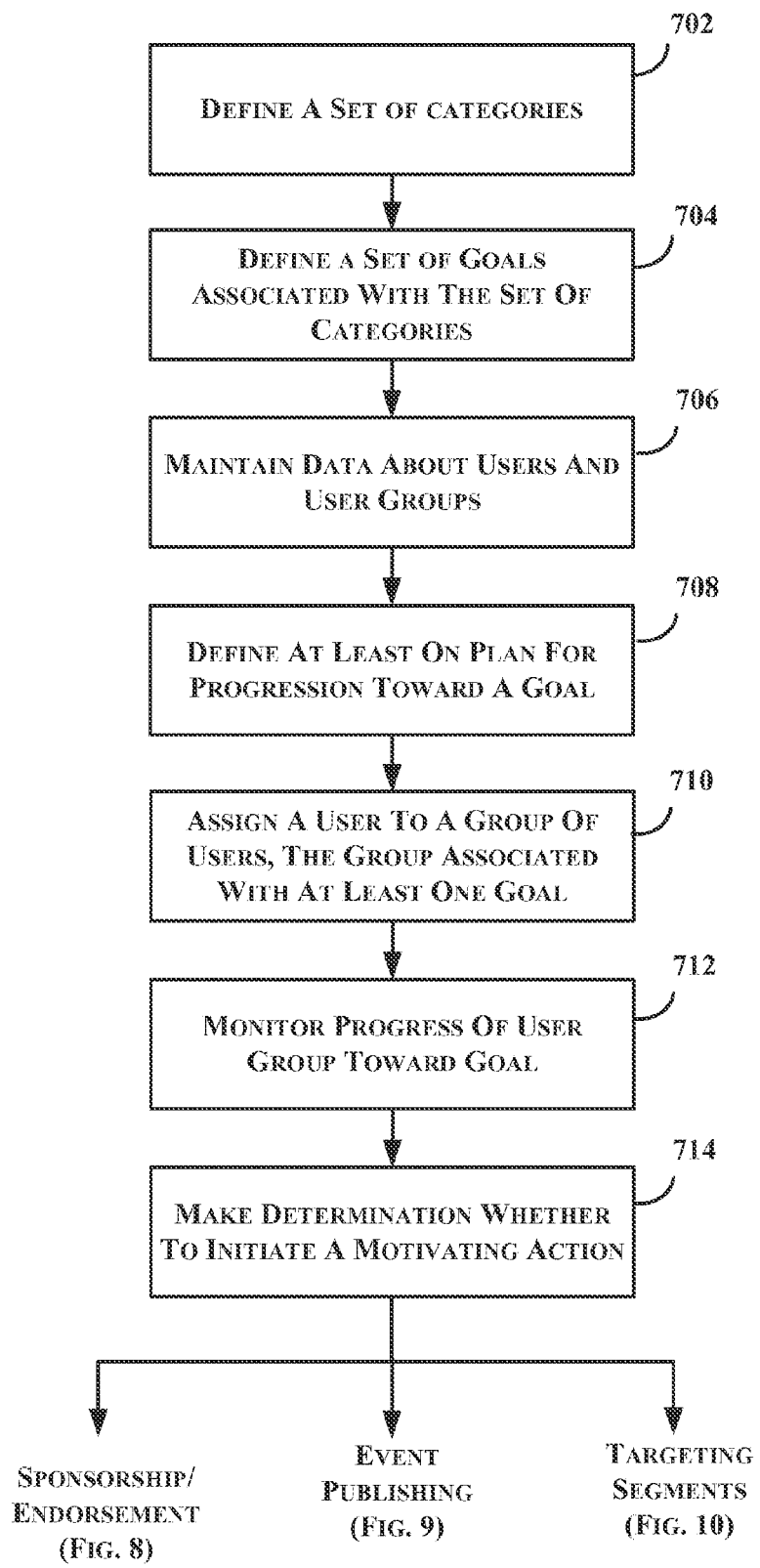

FIG. 7 provides a process flow example in accordance with one or more embodiments of the present disclosure. The process flow, and other process flows described herein, may be implemented by system 100, e.g., using some or all of the components of system 100 shown in FIG. 1.

At step 702, a set of categories is defined, which set may or may not be in the form of a category hierarchy. At step 704, a set of goals is defined, each defined goal is associated with one or more defined categories in the set of categories. At step 706, data about users and user groups is collected and maintained. User data may comprise the data described above and may include without limitation user profiles, historical data about a user's successes and failures associated with a goal, or goals, milestones associated with a goal, purchasing and/or browsing histories, product affinities, brand affinities, demographic information, social contacts, home address, employer name and address, sponsorships, endorsements, targeted advertising segment assignments, content and/or events in which the user group is involved, etc. User group data may comprise data described above and may include without limitation goal achievement(s), milestone achievement(s), users assigned to the group, which may include users subsequently re-assigned to another group, sponsorships, endorsements, targeted advertising segment assignments, content and/or events in which the user group is involved, etc.

At step 708, at least one progression plan for progression is established for each goal. Each progression plan may have one or more associated states or milestones, which may be used to measure progress of a group of user's toward the goal. In accordance with one or more embodiments, the progression plan may be associated with the category associated with the goal. At step 710, users are assigned to form a group of users. The user group is associated with at least one goal. In accordance with one or more embodiments, the users assigned to form the group may be selected based on a probability of success of the group of users in achieving the group's goal, the probability of success may be determined using at least one probability model, e.g., at least one of model(s) 114, which may be trained from previous experience with the plurality of users, the plurality of goals and determined outcomes of various user groups.

At step 712, system 110 monitors the group's progress toward a milestone and/or a goal, in general. System 110 may monitor progress based on self-declaration, autonomous feedback, group competitions, demonstrations, etc. At step 714, system 110 may make a determination determining, via the at least one computing device, whether or not to initiate action to motivate the group of user's toward achieving the group's goal, the determination may be made using the probability of success of the group of users in achieving the group's goal.

In accordance with one or more embodiments, system 100 may facilitate sponsorships and/or endorsements, event publication, and/or identification of segments for targeted advertisement.

Embodiments of the present disclosure provide ad targeting, endorsement and sponsorship opportunities, each of which provides an enriching opportunity for a brand to insert itself in brand-safe venues with controlled risk, where the risk may be controlled, or managed, using data collected by system 100, and/or predictions made by the system 100 on probability of success measurements determined by system 100 using data, e.g., data that it collects. With respect to targeting, embodiments of the present disclosure provide an ability for identifying the right users to expose the brand or specific brand message using data collected by system 100 on the users' past and currently-assigned goals, such data may be used to determine recent and past accomplishments and for determining a user's probability of success for a currently-assigned goal and/or a user's likelihood of successful pursuits in the future. With respect to endorsements, embodiments of the present disclosure provide an ability to pick the right user accomplishments to highlight and construct a brand message and/or ad creative message to show others. With respect to sponsorships, embodiments of the present disclosure provide economic brand specific incentives—as part of the incentive mechanisms provided by system 100—to motivate a user to achieve success in a goal relevant to the brand.

In accordance with one or more embodiments, an advertiser may sponsor a user/user group that has adopted a goal's progression map. In accordance with one or more embodiments, an advertiser may have input into designing a progression map, e.g., identifying milestones and/or criteria for determining successful completion of a milestone and advancement to a new milestone in the path. An advertiser may advertise to draw attention towards a sponsored progression map. In accordance with one or more embodiments, advertisers may bid for sponsorships and one or more advertisers, e.g., the highest paying advertiser(s), may be selected and may secure the sponsorship(s) for a given goal and or category for a period of time.

In accordance with one or more embodiments, advertisers may be offered an opportunity to become involved in one or more groups of users, and/or individual users, who are successfully progressing toward achievement of their goal(s). The offering may include a sponsorship of an entity 118, which sponsorship may be a micro-sponsorship. In accordance with one or more embodiments, a sponsorship, e.g., a micro-sponsorship, allows an entity 116 to associate a brand, and optionally provide additional incentive, to a user or user group. By way of a non-limiting example, an advertiser may provide incentive, such as money and/or merchandise, to the user(s) to motivate the user(s) at any point in the course of a progression path, including upon successful completion of a milestone, stage, etc.

Micro-sponsorship provides a mechanism by which an advertiser, e.g., a large brand advertiser, may sponsor a number of meaningful promotions, e.g., promotions having a financial incentive towards goods or services, for the personal development of users/user groups that have distinguished themselves in their path toward their goal(s). By way of another non-limiting example and by virtue of embodiments of the present disclosure which allow an advertiser to align its brand(s) with user(s)/user group(s) that have a proven track record of success, the advertiser is given the opportunity to align a brand's message and/or meaning with successful users of system 100, e.g., real world role models.

Large sponsorships typically involve a large risk, e.g., where an event is cancelled and/or the event, user group, user, etc. has some negative connotation. Using a micro sponsorship or other sponsorship provided in accordance with embodiments of the present disclosure, an advertiser is able to diffuse such risks. Large sponsorships are typically broad and blunt, while a micro-sponsorship allows an advertiser to more precisely penetrate communities that resonate with their brand's message around meaningful events. These relationships, in turn, can be used by advertisers to reinforce their brand message with a wider audience (e.g. by featuring a sponsored group's story in a video commercial).

Figure 8:
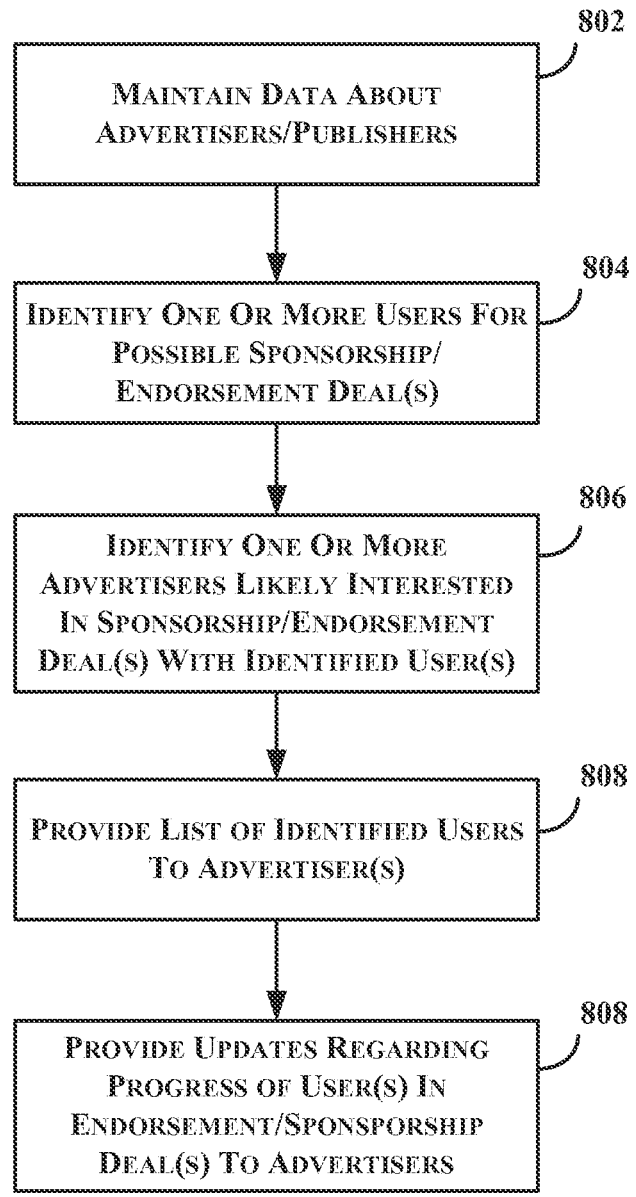

FIG. 8 provides an example of a sponsorship process flow in accordance with one or more embodiments of the present disclosure. At step 802 data about entities 112 is collected and maintained. The data may comprise information identifying the entity and associated brands. The data may further comprise associations between each entity and categories/goals of interest, history of sponsorships/endorsements, targeting advertisement information, etc.

At step 804, system 100 identifies one or more users/user groups as possible sponsorship and/or endorsement candidates. In accordance with one or more embodiments, candidates may be users, or groups of users, and may be users that have an established probability of success and/or user groups that have an established probability of success, which probability may be sustained over a period of time. That is, the user(s)/user group(s) with a proven track record. In accordance with one or more embodiments, system 100 determines a probability of success for a group, or groups of users, which probability of success is based on positive progress and confirmed achievement(s) toward a goal, or goals, and is indicative of the quality of the group of users and/or the users. Users may be identified as candidates based on their role in a user group and/or in the user community. By way of a non-limiting example, system 100 may identify a user as a leader, e.g., a user that progresses before others in the group and/or a user who provides assistance to other users, e.g., facilitates another user's progress. At step 806, system 100 may identify a number of advertisers who may be interested in a sponsorship associated with the user(s) and/or the user group(s) determined to have a proven probability of success, and allow one or more of said advertisers to sponsor one or more of the user(s) and/or user group(s).

By way of a non-limiting example, system 100 may associate a goal and/or goal category(ies) with one or more advertisers, e.g., the advertiser's brands. An association may be specified by an entity 116, 118 and/or 120 advertiser. By way of some non-limiting examples, an association might be explicitly specified by an entity, such as by an advertiser/publisher 116 identifying one or more goals/categories that the advertiser/publisher 116 has interest in in connection with a sponsorship and/or an endorsement. By way of a further non-limiting example, a user or user group may indicate an interest in a brand, or brands, which interest may indicate an association between one or more advertiser's brand(s) and one or more categories and/or goals. By way of yet another non-limiting example, information about users, e.g., demographic information, browsing and/or purchasing history (ies), geographic location, and/or information about an advertiser and/or its brand may be used to identify an association. It should be apparent that an association may be formed in any manner now known or later developed.

Such associations may be used by system 100, at step 806, to identify one or more advertiser(s) that may wish to sponsor one or more users/user groups, and notify the identified advertisers, at step 808. Step 806 may be performed by system 100 in response to a sponsorship request from an advertiser, and provide the advertiser with one or more users/user groups that the advertiser may wish to sponsor, the one or more users/user groups having shown that they will likely continue to progress toward their goals and/or achieve their goals. At step 808, system 100 may track a user and/or a user group, and provide updates regarding the progress of the user/user group to the advertiser. As discussed herein, the advertiser might cancel a sponsorship where the update is not favorable, e.g., a user's or user group's progress toward a goal has stalled and/or the probability of success of achieving the goal has decreased to a point that it is questionable that the goal will be achieved.

In accordance with one or more embodiments, system 100 may select one or more advertisers from a set of advertisers, e.g., advertisers 116, using one or more selection criteria. The selected advertisers may then participate in ad targeting, sponsorship(s), endorsement(s), etc. By way of a non-limiting example, the selection criteria may be include a rank associated with each advertiser being considered for selection, which rank may be determined using feedback from the entities 116, 118 and/or 120. By way of a further non-limiting example, the feedback may be from users and/or user groups 118 selected by an advertisers for prior ad targeting, endorsing and/or sponsoring opportunities.

In accordance with one or more embodiments, system 100 matches entities 116 with entities 118 for advertising and/or publishing opportunities. By way of a non-limiting example, system 100 may match one or more advertisers 116 with one or more users 118, segments of users 118, groups of users 118, etc. for targeted advertising. By way of a further non-limiting example, system 100 may match one or more advertisers 116 with one or more users/user groups 118 for a sponsorship, or sponsorships, system 100 may match one or more advertisers 116 with one or more users/user groups 118 for an endorsement, or endorsements, etc. By way of a further non-limiting example, system 100 may match one or more publishers 118 with one or more users 118 to receive content from the publisher(s) 118, such as a publication of content via a user interface provided to the user(s) 118.

In accordance with one or more embodiments, an advertiser may offer a financial incentive to a user group that is pledging to reach a goal, e.g., a personal goal that has meaning to the users of the group, such that the advertiser may add a financial reward to "sweeten the pot." By way of some non-limiting examples, an advertiser might make a promotional offer, or offers, that may be earned, or contribute to charity on behalf of the user group and/or one or more users. By way of some further non-limiting examples, advertisers might increase the financial reward progressively in response to a team signing up for an incremental milestone upon completion of the previous one. By promising conditional earning of financial reward related to goods and services of the advertiser, upon successful milestone completion, brands and advertisers can employ return on investment metrics to optimally allocate marketing dollars more efficiently by design towards positive and more uplifting stories.

In accordance with one or more embodiments, user groups may be given a choice of advertisers willing to sponsor their endeavors, which choice may include terms of each sponsorship that is being offered to them. Thus, a user group may be able to select one or more sponsorships. Embodiments of the present disclosure may allow entities, e.g., users and/or user groups, to rate sponsors and/or provide feedback regarding sponsors and/or sponsorships to system 100. In so doing, system 100 may maintain quality of transactions as well as provide a ranking of sponsored incentives offered, e.g., a ranking of sponsored incentives in each category. In accordance with one or more embodiments, sponsorships are conditioned on completion, e.g., completion of a stage or milestone, which completion is verified via system 100. A reward associated with a sponsorship may therefore be given is a timely and responsive manner. System 100 identifies those users/user groups with proven track records thereby minimizing a sponsor's risk of exposure to misallocated funds.

Furthermore, sponsorships that are made available by system 100 allow advertisers to directly penetrate and surface their brand presence around every day meaningful events in the lives of people, as opposed to trying to expose them to branding messages without context.

In accordance with one or more embodiments and as discussed above with reference to step 808 of FIG. 8, system 100 may continue to monitor a probability of success associated with a user/user group and provide feedback to an advertiser, and an advertiser may have an option to cancel a sponsorship based on the feedback provided to the advertiser. In other words, a sponsorship may be conditioned on criteria, which criteria may include a threshold probability of success, and system 100 may provide feedback, which feedback may include a current probability of success, to an advertiser related to the criteria. System 100 may be configured to automatically cancel a sponsorship based on the criteria and feedback, e.g., a threshold probability of success is not satisfied by a sponsored user and/or user group.

In accordance with one or more embodiments, FIG. 8 may also be applied to an endorsement, whereby an advertiser may be interested in using a user or group of users to endorse a product, brand, etc. System 100 may use information collected about its users and/or user groups, e.g., probability of success showing a proven track record, to identify one or more users and/or user groups that the advertiser may wish to use feature in an advertisement, or other creative content. In accordance with one or more embodiments, system 100 may identify the one or more users/user groups based on their proven track record and/or their goals, which may have an association with the advertiser's brand and/or current messaging. The advertisers may select one or more users and/or user groups and employ them in creative that are targeted and distributed throughout the advertiser's advertisement campaigns. Additionally, the advertisers may offer a sponsorship to the users/user groups selected for the advertisement(s), which may provide incentive for the user(s)/user group(s) to achieve success, which success can lead to further positive brand exposure.

Endorsements that are provided by system 100 may be micro-endorsements that provide an alternative to mega endorsement deals, e.g., mega endorsement deals by large brand advertisers with celebrities. Embodiments of the present disclosure allow for endorsements, and associations with users/user groups, which are conditioned on demonstrated progress, and system 100 may be used to identify alternative users/user groups that may replace currently-endorsed users/user groups where the current users/user groups fail to maintain a threshold progress and/or probability of success. This enables automatic and relevant dynamically selected endorsees for the message that needs to be communicated via campaigns.

Micro-endorsements may be implemented on the local level. In accordance with one or more embodiments, a user group may acquire a sponsor that wishes to extend its brand within a local region of the user group, e.g., the sponsor may pay extend its brand into a local region via a small fee to endorse users who are tied to the region, e.g., a neighborhood, town or city.

In accordance with one or more embodiments, as with a sponsorship, an endorsement may be conditioned on historical and current records of success. Thus, embodiments of the present disclosure provide opportunities for an entity to associate its brand with one or more users and/or user groups via an endorsement of the one or more users and/or user groups, which endorsement might be focused, at least to some extent, in the community that may include the users.

In accordance with one or more embodiments, system 100 may use information collected for its users/user groups to identify those users/user groups that have a proven record of success and/or have achieved specific milestones toward its goals. In accordance with one or more embodiments, an endorser may specify criteria for filtering the users/user groups identified by system 100, which criteria may be used to automatically qualify certain of the identified users/user groups to be used, or to be identified as candidates for, an endorsement. By way of some non-limiting examples, the filtering criteria might be based on demographics, geographic location, type of goal that was achieved or is being pursued, etc. Endorsements may be offered in a timely manner, may be short lived, and conditional. Furthermore, by tracking user/user group progress, risk of negative exposure of a brand in associating with the user(s)/user group(s) may be managed and minimized. Furthermore, endorsements may be established in advance, and may be awarded to those that satisfy the milestone success criteria in areas that are relevant for the brands customer segment.

With reference to FIG. 7 and in accordance with one or more embodiments, system 100 may be configured to identify content, e.g., content associated with an event, which is relevant to a user or users. In accordance with one or more embodiments, content, e.g., an audio, video, multimedia content stream, that is generated via system 100 may be published and shared, e.g., shared online. Furthermore, platforms that publish the content, e.g., online publishers, may be used to collect feedback or other information that may be used to track a progress of a user/user group toward a goal or milestone along a progression path of a goal. By way of some non-limiting examples, online publishers such as YouTube™, Flickr™, Facebook™, etc. may be used to publish event content. By way of some non-limiting examples, content items, e.g., content items determined to be of personal relevance to one or more users or other entities, may be infused within one or more content streams for consumption by one or more persons when the content streams are published by one or more content publishers 116. The content streams may be published online in one or more web pages or in another user interface, which may be personalized for each person. By way of a further non-limiting example, a content stream may be computer-generated and may comprise multiple content items, which chronicle a user's journey with respect to one or more goals pursued by the user. By way of a further non-limiting example, a content stream may depict a recent event, or events, and/or may cover a user's progression, or journey, depicting multiple events, and may include a timeline of the events.

In accordance with one or more such embodiments, a user's home web page, or other user interface, may be personalized to include some content generated via system 100, which content is determined to be of interest to the user. In accordance with one or more embodiments, system 100 provides a mechanism to highlight, track, and target meaningful events that hold special significance for a community of users and/or user groups pursuing goals of personal significance. Event content published using existing publishing channels may be incorporated in a web page, e.g., a user's home page, which content may be determined to be of interest to the user. By way of some non-limiting examples, the content of interest to a user may comprise content of an event involving the user, content concerning a goal of interest to the user, content generated for a user group that is striving toward the same or a similar goal, etc. System 100 may associate users and content in any manner, and such associations may be used to identify content of interest to a user, which identification may be used to personalize a user interface for the user. System 100 may further associate one or more contents items with an assigned goal or milestone, with an achieved goal or milestone, an endorsement earned, a sponsorship earned, etc.

The personalization of the web page for a user, or users, increases the relevance of the content that is displayed on the web page. Additionally and by virtue of the increased relevance, a marketplace for ads on the page may attract advertisers who wish to associate with positive events of special deeper meaning to users.

Figure 9:
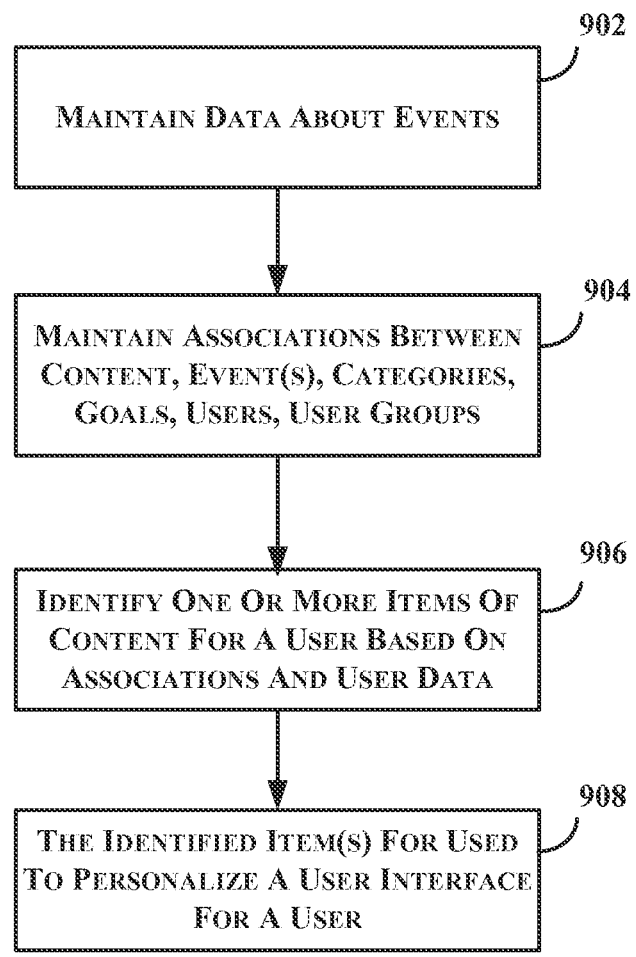

FIG. 9 provides an example of a user interface personalization process flow in accordance with one or more embodiments of the present disclosure. At step 902, system 100 maintains data about an event. In accordance with one or more embodiments, the content that is generated from system 100 is related to events, each of which may pertain to a single state or milestone along a path toward a goal by a user group, or events across categories of concurrent milestones of goals, or across several successive and incremental milestones and goals. System 100 may associate attributes, such as attributes pertaining to the user group, the category and/or goal associated with the event, the significance of the milestone, etc., with the content.

At step 904, system 100 maintains associations between content, events, categories, goals, users, and/or user groups. System 100 may associate attributes pertaining to the user, user group, category and/or goal associated with attributes of an event. At step 906, system 100 may identify one or more users, advertisers/publishers and/or other entities having an interest in one or more items of content, and may notify the identified entity(ies) of the existence of the content. At step 908, the identified content may be included in a user interface to provide a personalized interface that includes content about events that is determined to be of interest to an entity.

In accordance with one or more embodiments, the content may be forwarded to the entities identified in step 906, e.g. as part of the notification. Entities may be identified based on express information, e.g., a subscription, request, etc., and/or based on an implicit understanding of an entity's interest. By way of some non-limiting examples, system 100 may develop an implicit understanding of an user's interest based on the user's past involvement with a goal, user group, etc., and system 100 may develop an implicit understanding of an advertiser's/publisher's interest based on its past sponsorships, endorsements, etc., and the involved user(s) and/or user group(s).

In accordance with one or more embodiments, system 100 may receive feedback from a user, or users, about one or more content items that are made available to the user, e.g., content items that are inserted into the a personalized web page for the user. System 100 may user the feedback to rank content items relative to other content items, e.g., content items available via system 100 and/or content items from other systems. By way of some non-limiting example, the ranking may be used in determining ad placement by advertisers.

In accordance with one or more embodiments, the content generated in accordance with one or more embodiments may be made available by system 100 for publication to any publication platform, online, broadcast, etc. A publication platform publishing content may be any platform able to publish the content. By way of a non-limiting example, the content may be published at a news web site, and the content may be intermingled with its news content. In so doing, the endeavors of users of system 100 may reach a large audience.

Referring again to FIG. 7, in accordance with one or more embodiments, data maintained by system 100 may be used to identify users for inclusion in a targeted advertisement segment. System 100 collects data that identifies, and/or may be used to identify, associations of users to categories of interest, success or failure rates of their assigned user group(s), level of engagement and/or a desire to evolve. Additionally, system 100 may collect data about a user's success and/or failures, persistence, etc., which data may be mapped to specific categories. As users play different roles and evolve along states of positive development within categories, their usage patterns reveals the community roles, e.g., leader, follower, etc., that they most effectively play, and how persistent they are. By way of a non-limiting example, a user may be identified by system 100 as a leader or a follower using the user's personal progression along various milestones relative to other members of the user's group. Such traits can help construct meaningful targets for brands, to either reach with tailored specific ads containing micro-endorsement messages, or to target via sponsorships and endorsements.

In accordance with one or more embodiments, relevant targets may be packaged as relevant and meaningful segments aligned with an advertiser's aspirational messages, and delivered to content ranking mechanisms, which may include publishers and advertisers.

Figure 10:
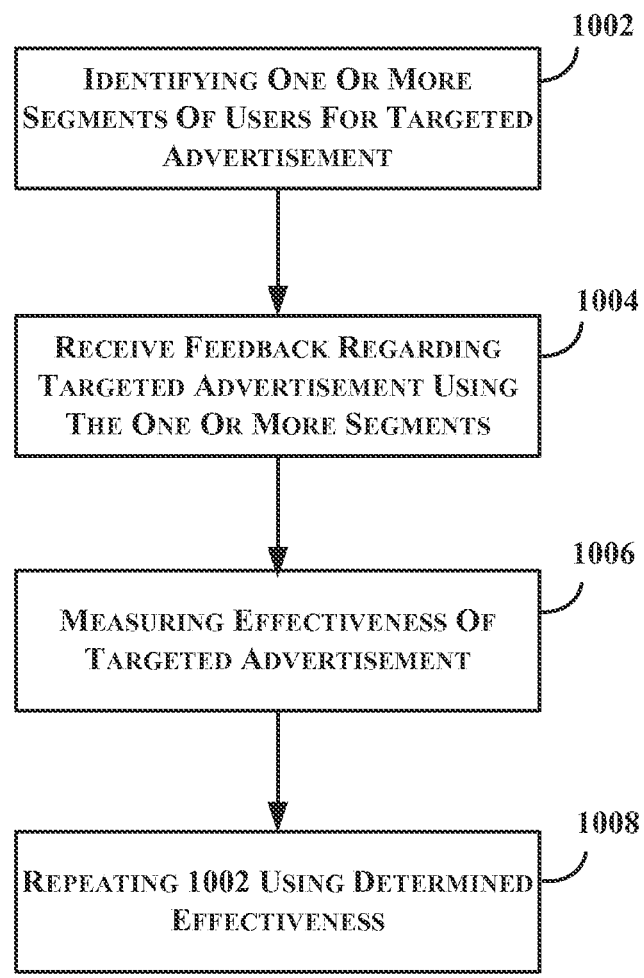

FIG. 10 provides an example of a targeted segment process flow in accordance with one or more embodiments of the present disclosure. At step 1002, system 100 may use data for user groups and users, e.g., based on associated user groups and their performance, to identify a segment, or segments, of users that align with broad advertiser interest categories, and across various levels of quality. Similarly, system 100 may provide data to publishers to use to generate relevance ranking schemes for content and experiences that compete for the user's attention.

In accordance with one or more embodiments, system 100 may use a user's development profile in combination with other demographic data to generate insights for targeting, which may be used in determining the best ads to show, or the best experiences to deliver for high relevance to the user. The effectiveness of such targeting may be compared with traditional forms of targeting, generally or with respect to specific categories, brands, and/or advertisers.

At step 1002, system 100 may receive feedback regarding a targeted advertisement using the one or more segments identified in step 1002. The feedback may be used, at step 1006, to measure the effectively of the targeted advertisement and/or the segment identification performed in step 1002. At step 1008, step 1002 may be repeated using the feedback received in step 1004 and the effectiveness measurement(s) of step 1006.

Figure 11:
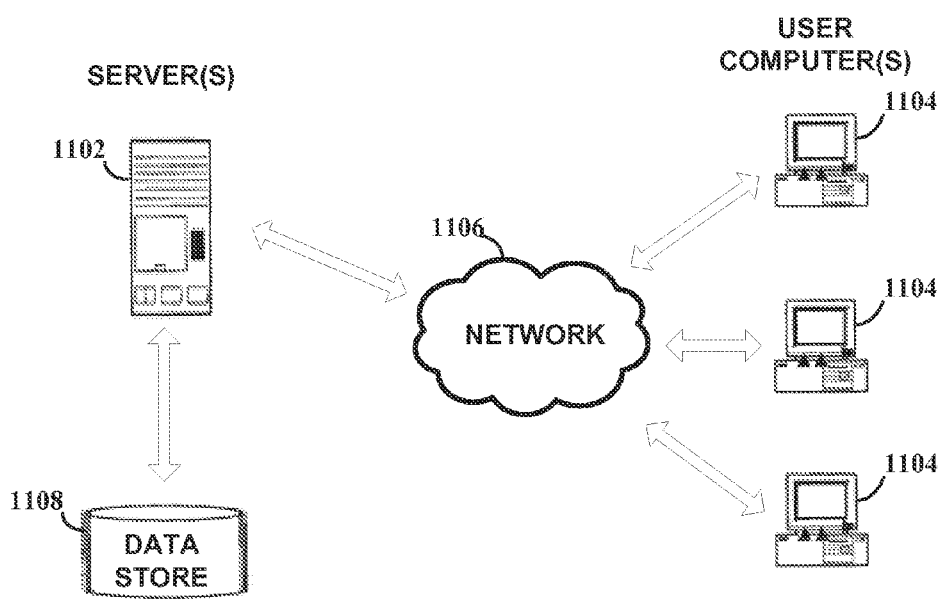
FIG. 11 illustrates some components that can be used in connection with one or more embodiments of the present disclosure.

FIG. 11 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1102 can be configured to execute program code, instructions, etc. to provide functionality in accordance with one or more embodiments of the present disclosure.

Computing device 1102 can serve content to user computing devices 1104 using a browser application via a network 1106. Data store 1108, which can include data store 114, can be used to store data collected and/or used by system 100, program code to configure a server 1102 to implement any one or more embodiments disclosed herein, etc.

The user computing device 1104 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1102 and the user computing device 1104 can include one or more processors, memory, a removable media reader, network interface, display and interface, and one or more input devices, e.g., keyboard, keypad, mouse, etc. and input device interface, for example. One skilled in the art will recognize that server 1102 and user computing device 1104 may be configured in many different ways and implemented using many different combinations of hardware, software, or firmware.

In accordance with one or more embodiments, a computing device 1102 can make a user interface available to a user computing device 1104 via the network 1106. The user interface made available to the user computing device 1104 can include content items, or identifiers (e.g., URLs) selected for the user interface in accordance with one or more embodiments of the present invention. In accordance with one or more embodiments, computing device 1102 makes a user interface available to a user computing device 1104 by communicating a definition of the user interface to the user computing device 1104 via the network 1106. The user interface definition can be specified using any of a number of languages, including without limitation a markup language such as Hypertext Markup Language, scripts, applets and the like. The user interface definition can be processed by an application executing on the user computing device 1104, such as a browser application, to output the user interface on a display coupled, e.g., a display directly or indirectly connected, to the user computing device 1104.

In an embodiment the network 1106 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE). 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 11. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 12:
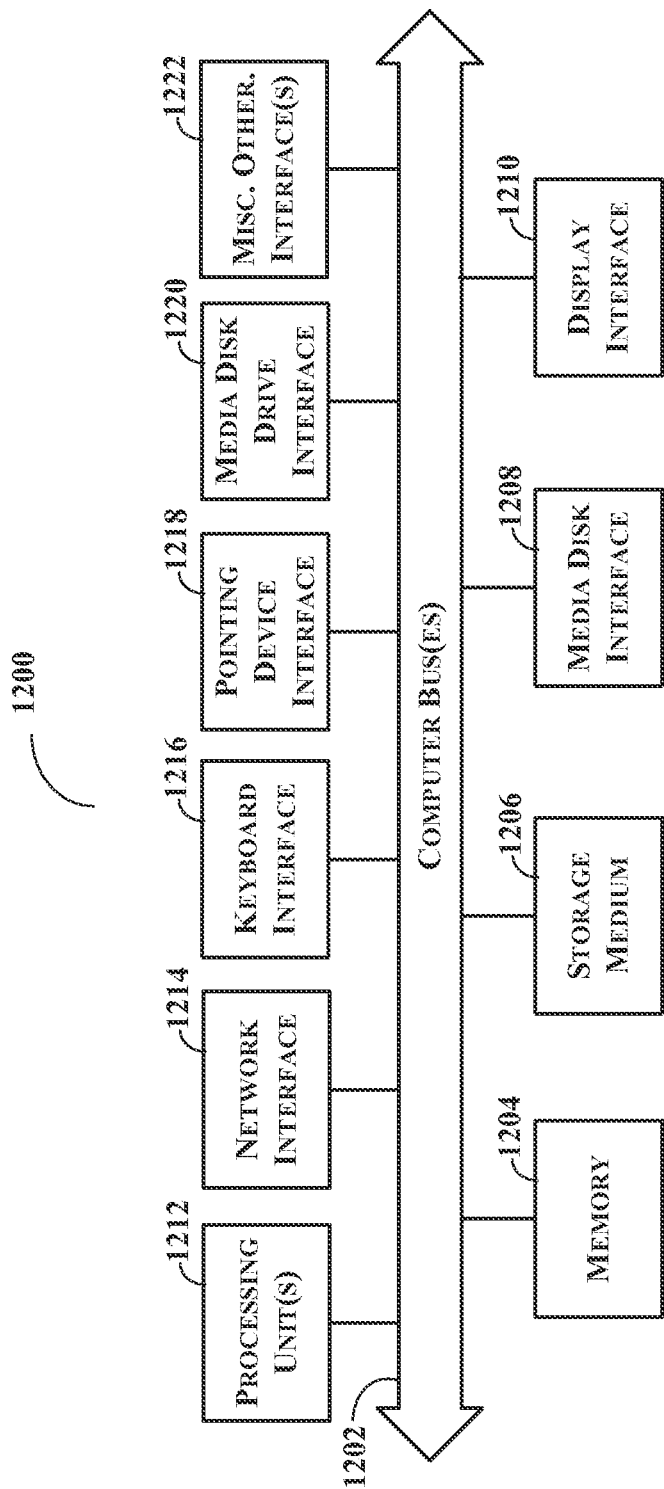
FIG. 12 is a detailed block diagram illustrating an internal architecture of a computing device in accordance with one or more embodiments of the present disclosure.

FIG. 12 is a detailed block diagram illustrating an internal architecture of a computing device, e.g., a computing device such as server 1102 or user computing device 1104, in accordance with one or more embodiments of the present disclosure. As shown in FIG. 12, internal architecture 1200 includes one or more processing units, processors, or processing cores, (also referred to herein as CPUs) 1212, which interface with at least one computer bus 1202. Also interfacing with computer bus 1202 are computer-readable medium, or media, 1206, network interface 1214, memory 1204, e.g., random access memory (RAM), run-time transient memory, read only memory (ROM), etc., media disk drive interface 1220 as an interface for a drive that can read and/or write to media including removable media such as floppy, CD-ROM, DVD, etc. media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs, device drivers, and software modules that comprise program code, and/or computer-executable process steps, incorporating functionality described herein, e.g., one or more of process flows described herein. CPU 1212 first loads computer-executable process steps from storage, e.g., memory 1204, computer-readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

defining, via at least one computing device, a plurality of goals, each goal's definition comprising a progression plan comprising a set of milestones to measure progress toward the goal;

assigning, via the at least one computing device, users from a plurality of users to goals from the plurality of goals, each user being assigned to a goal by assigning the user to a user group having the goal based on a probability of success of the user achieving the goal while the user is within the user group, the probability of success is determined using at least one probability model trained from previous experience with the plurality of users and determined outcomes of the plurality of users in achieving goals from the plurality of goals, wherein the probability of success for each user is determined using the at least one probability model and information about the user, the probability model is further used in identifying timing and use of motivators to aid in achieving the assigned goal;

collecting, via the at the least one computing device, data about events that occur in connection with the users' progress toward their assigned goals, the event data comprising information about each event and including information about content items associated with the events;

determining, via the at least one computing device, a relevance of at least one content item to at least one of the users of the plurality, the relevance being determined using the data collected about the events and the information about the content items associated with the events; and causing, via the at least one computing device, the at least one content item to be inserted in a user interface for display based on the determined relevance of the at least one content item to the at least one of the users of the plurality.

2. The method of claim 1, the causing further comprising causing the at least one content item to be inserted in a user interface for display at a device of the at least one of the users.

3. The method of claim 1, the determining further comprising:
determining, via the at least one computing device, the relevance of at least one content item to at least one of the users of the plurality, the relevance being determined using the data collected about the events, the information about the content items associated with the events and one or more indicators of interest in the at least one content by the at least one of the users.

4. The method of claim 1, wherein one or more of the content items are associated with a milestone of a goal assigned to one or more of the users of the plurality of users.

5. The method of claim 1, wherein one or more of the content items are associated with a milestone of a goal achieved by one or more of the users of the plurality of users.

6. The method of claim 1, wherein one or more of the content items are associated with an endorsement earned by a user of the plurality of users.

7. The method of claim 1, wherein one or more of the content items are associated with a sponsorship earned by a user of the plurality of users.

8. The method of claim 1, wherein the user interface comprises a web page personalized for the at least one of the users and including the at least one content item.

9. The method of claim 1, the causing further comprising:
making, via the at least one computing device, the at least one content item available to a content publisher for inclusion in the user interface.

10. The method of claim 9, the causing further comprising:
making, via the at least one computing device, the at least one content item available to a content publisher for inclusion in the user interface as part of a computer-generated content item.

11. The method of claim 1, further comprising:
receiving, via the at least one computing device, feedback on the at least one content item inserted in a user interface; and
ranking, via the at least one computing device, the at least one content item relative to other content items using the feedback.

12. A system comprising:
at least one computing device, each computing device comprising one or more processors and a storage medium for tangibly storing thereon program logic for execution by the processor, the stored program logic comprising:
defining logic executed by the one or more processors for defining a plurality of goals, each goal's definition comprising a progression plan comprising a set of milestones to measure progress toward the goal;
assigning logic executed by the one or more processors for assigning users from a plurality of users to goals from the plurality of goals, each user being assigned to a goal by assigning the user to a user group having the goal based on a probability of success of the user achieving the goal while the user is within the user group, the probability of success is determined using at least one probability model trained from previous experience with the plurality of users and determined outcomes of the plurality of users in achieving goals from the plurality of goals, wherein the probability of success for each user is determined using the at least one probability model and information about the user, the probability model is further used in identifying timing and use of motivators to aid in achieving the assigned goal;
collecting logic executed by the one or more processors for collecting data about events that occur in connection with the users' progress toward their assigned goals, the event data comprising information about each event and including information about content items associated with the events;
determining logic executed by the one or more processors for determining a relevance of at least one content item to at least one of the users of the plurality, the relevance being determined using the data collected about the events and the information about the content items associated with the events; and
causing logic executed by the one or more processors for causing the at least one content item to be inserted in a user interface for display based on the determined relevance of the at least one content item to the at least one of the users of the plurality.

13. The system of claim 12, the causing logic executed by the one or more processors for causing further comprising causing logic executed by the one or more processors for causing the at least one content item to be inserted in a user interface for display at a device of the at least one of the users.

14. The system of claim 12, the stored program logic further comprising:
determining logic executed by the one or more processors for determining the relevance of at least one content item to at least one of the users of the plurality, the relevance being determined using the data collected about the events, the information about the content items associated with the events and one or more indicators of interest in the at least one content by the at least one of the users.

15. The system of claim 12, wherein one or more of the content items are associated with a milestone of a goal assigned to one or more of the users of the plurality of users.

16. The system of claim 12, wherein one or more of the content items are associated with a milestone of a goal achieved by one or more of the users of the plurality of users.

17. The system of claim 12, wherein one or more of the content items are associated with an endorsement earned by a user of the plurality of users.

18. The system of claim 12, wherein one or more of the content items are associated with a sponsorship earned by a user of the plurality of users.

19. The system of claim 12, wherein the user interface comprises a web page personalized for the at least one of the users and including the at least one content item.

20. The system of claim 12, the causing logic executed by the one or more processors for causing further comprising:
making logic executed by the one or more processors for making the at least one content item available to a content publisher for inclusion in the user interface.

21. The system of claim 20, the causing logic executed by the one or more processors for causing further comprising:
making logic executed by the one or more processors for making the at least one content item available to a content publisher for inclusion in the user interface as part of a computer-generated content item.

22. The system of claim 12, the stored program logic further comprising:
receiving logic executed by the one or more processors for receiving feedback on the at least one content item inserted in a user interface; and
ranking logic executed by the one or more processors for ranking the at least one content item relative to other content items using the feedback.

23. A computer readable non-transitory storage medium for tangibly storing thereon computer readable instructions that when executed cause at least one processor to:
define a plurality of goals, each goal's definition comprising a progression plan comprising a set of milestones to measure progress toward the goal;
assign users from a plurality of users to goals from the plurality of goals, each user being assigned to a goal by assigning the user to a user group having the goal based on a probability of success of the user achieving the goal while the user is within the user group, the probability of success is determined using at least one probability model trained from previous experience with the plurality of users and determined outcomes of the plurality of users in achieving goals from the plurality of goals, wherein the probability of success is determined using the at least one probability model and information about the user, the probability model is further used in identifying timing and use of motivators to aid in achieving the assigned goal;
collect data about events that occur in connection with the users' progress toward their assigned goals, the event data comprising information about each event and including information about content items associated with the events;
determine a relevance of at least one content item to at least one of the users of the plurality, the relevance being determined using the data collected about the events and the information about the content items associated with the events; and
cause the at least one content item to be inserted in a user interface for display based on the determined relevance of the at least one content item to the at least one of the users of the plurality.

24. The computer readable non-transitory storage medium of claim 23, the instructions to cause further comprising instructions to cause the at least one content item to be inserted in a user interface for display at a device of the at least one of the users.

25. The computer readable non-transitory storage medium of claim 23, the instructions to determine further comprising instructions to:
determine the relevance of at least one content item to at least one of the users of the plurality, the relevance being determined using the data collected about the events, the information about the content items associated with the events and one or more indicators of interest in the at least one content by the at least one of the users.

26. The computer readable non-transitory storage medium of claim 23, wherein one or more of the content items are associated with a milestone of a goal assigned to one or more of the users of the plurality of users.

27. The computer readable non-transitory storage medium of claim 23, wherein one or more of the content items are associated with a milestone of a goal achieved by one or more of the users of the plurality of users.

28. The computer readable non-transitory storage medium of claim 23, wherein one or more of the content items are associated with an endorsement earned by a user of the plurality of users.

29. The computer readable non-transitory storage medium of claim 23, wherein one or more of the content items are associated with a sponsorship earned by a user of the plurality of users.

30. The computer readable non-transitory storage medium of claim 23, wherein the user interface comprises a web page personalized for the at least one of the users and including the at least one content item.

31. The computer readable non-transitory storage medium of claim 23, the instructions to cause further comprising instructions to:
make the at least one content item available to a content publisher for inclusion in the user interface.

32. The computer readable non-transitory storage medium of claim 31, the instructions to cause further comprising instructions to:
making, via the at least one computing device, the at least one content item available to a content publisher for inclusion in the user interface as part of a computer-generated content item.

33. The computer readable non-transitory storage medium of claim 23, further comprising instructions to:
receive feedback on the at least one content item inserted in a user interface; and rank the at least one content item relative to other content items using the feedback.

* * * * *